US010097399B1

(12) United States Patent
Pillay (10) Patent No.: US 10,097,399 B1
(45) Date of Patent: Oct. 9, 2018

(54) DISTRIBUTED COMPUTING MANAGEMENT LINKS

(71) Applicant: Amazon Technologies, Inc., Reno, NV (US)

(72) Inventor: Suvenderan Pillay, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 148 days.

(21) Appl. No.: 13/739,948

(22) Filed: Jan. 11, 2013

(51) Int. Cl.
| G06F 15/173 | (2006.01) |
| H04L 12/24 | (2006.01) |
| G06F 11/14 | (2006.01) |
| H04L 29/08 | (2006.01) |
| H04N 21/482 | (2011.01) |
| H04N 21/472 | (2011.01) |

(52) U.S. Cl.
CPC .......... *H04L 41/00* (2013.01); *G06F 11/1453* (2013.01); *G06F 11/1464* (2013.01); *H04L 67/02* (2013.01); *H04N 21/47202* (2013.01); *H04N 21/482* (2013.01)

(58) Field of Classification Search
CPC ......... H04L 67/02; H04L 41/00; H04L 67/10; H04N 21/482; H04N 21/47202; G06F 11/1453; G06F 11/1451; G06F 2201/84; G06F 11/1456; G06F 11/1461; G06F 11/1464; G06F 3/065

USPC .................................................. 709/223, 217
See application file for complete search history.

(56) References Cited

U.S. PATENT DOCUMENTS

| 8,661,076 | B2* | 2/2014 | Herman .................. H04L 67/26 705/319 |
| 9,183,316 | B2* | 11/2015 | Van Den Driessche ..................... G06F 17/3089 |
| 2007/0198802 | A1* | 8/2007 | Kavuri .................. G06F 3/0605 711/170 |
| 2009/0037287 | A1* | 2/2009 | Baitalmal et al. .............. 705/26 |
| 2009/0199210 | A1* | 8/2009 | Smith, Jr. ............... H04L 67/02 719/315 |
| 2011/0276396 | A1* | 11/2011 | Rathod .............. G06Q 30/0255 705/14.49 |

* cited by examiner

*Primary Examiner* — Joseph E Avellino
*Assistant Examiner* — Rachel J Hackenberg
(74) *Attorney, Agent, or Firm* — Lee & Hayes, PLLC (57) ABSTRACT

Customized action links may be provided to users to cause performance of computing resource jobs that may include more than one resource operation. For example, resource operations associated with performing a job or action of a distributed system may be determined. One or more instructions may then be formulated for performing at least a subset of the determined resource operations. A link to replay the formulated instructions may then be provided to another system or one or more users.

24 Claims, 7 Drawing Sheets

DISTRIBUTED COMPUTING MANAGEMENT LINKS

BACKGROUND

Distributed computing systems as well as distributed computing services have become widely available in recent years. In some cases, such services and/or systems may manage data of a customer. These services may include one or more computing devices configured to act as machine instances (e.g., virtual computer systems) and/or storage resources (e.g., virtual disk drives), for example. During the management of such services, customers may wish to have particular jobs or actions performed on their data. Additionally, a computing system, user, or other entity may choose to request or otherwise cause jobs or actions to be performed on their data, as desired. However, causing such jobs or actions to be performed may pose challenges to customers and/or service providers.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing techniques for generating, managing, and/or providing customized action links to customers or other users of a distributed computing system. In some examples, an action link may point to a macro or other set of instructions configured to play, replay, or otherwise implement a set of instructions. For example, an action link may be a macro that can replay a set of instructions of a workflow. An action link may also be a hyperlink that points a user to a macro stored on another computing device. Selection of the hyperlink may activate or otherwise cause implementation of the workflow or the macro. In some cases, an action link may be a selectable icon, text, or other graphical user interface (GUI) element that may cause instructions, a macro, or a workflow to be performed.

In some examples, a customized action link may be based at least in part on a customer goal or a request for a particular action or set of actions. For example, a customer of a service provider (e.g., a distributed computing system web service provider or the like) may wish to have a certain portion of data backed-up. In this example, the customer may already subscribe to a web service that stored data in a distributed computing system (e.g., in a cloud computing network). However, backing up the data may entail one or more web service requests being made, one or more application programming interface (API) calls being made, and/or one or more distributed resource operations being requested. In other words, due to the complex nature of cloud storage, the customer may not have the tools or knowledge needed to implement their goal (i.e., backing up their data). As such, the customer may request that the service provider provide a method or other functionality for backing up ones data. In some examples, based at least in part on this request, the service provider may generate, manage, and/or provide links for performing jobs (also referred to as actions or sets of actions) of the distributed system. In other examples, the customer may have configured their account with one or more goals that could be accomplished by any one or more different jobs. As such, the service provider may also be able to generate, manage, and/or provide a customized action link to the customer based at least in part on these account configurations.

Additionally, in some examples, the action links may be provided or otherwise received from third-party computing systems (e.g., link creators) that are not affiliated with the service provider. As such, a marketplace of action links may be provided to customers for selecting among one or more different types of action links from one or more different link categories. Categories may include, but are not limited to, storage links (e.g., utilizing virtual and/or distributed storage), compute links (e.g., utilizing virtual machine processing), database links, infrastructure setup links, or the like. Additionally, customers or other users may be able to review service provider-generated links as well as third-party-generated links. As such, customer viewing the marketplace may filter, rank, or otherwise narrow down options for purchasing, leasing, or otherwise utilizing links for a fee, as desired.

Further, in some examples, a customized action link may include metadata or other information for display via a GUI. In this way, the customer may preview or visualize the instructions included in the link or macro. For example, a link that provides a macro for spreading data out over multiple geographic areas may include one or more icons or images that can visually display the steps to be performed to implement the job. As such, prior to selecting the link for execution, the customer may view what the macro entails and/or decide whether to implement the macro. Additionally, in some examples, the links may provide roll-back options for undoing jobs or otherwise resetting a customers distributed resources to an earlier state. Additionally, in some examples, the service provider that provides the action links may be configured to implement the macros based at least in part on selection of the link by the customer. Implementation of the macros may be performed by utilizing a workflow engine or other system for performing one or more instructions in a particular (and configurable) sequence.

By generating, managing, and/or providing such action links, the customers may be able to perform (or cause to be performed) complicated distributed computing resource operations without full knowledge of the distributed system and/or the appropriate instructions and/or API calls used to perform such operations. Additionally, by providing a marketplace for commoditizing such action links, the service provider may incentivize the customers and/or third-party providers to enhance or otherwise add additional value to the distributed computing environment.

Figure 1:
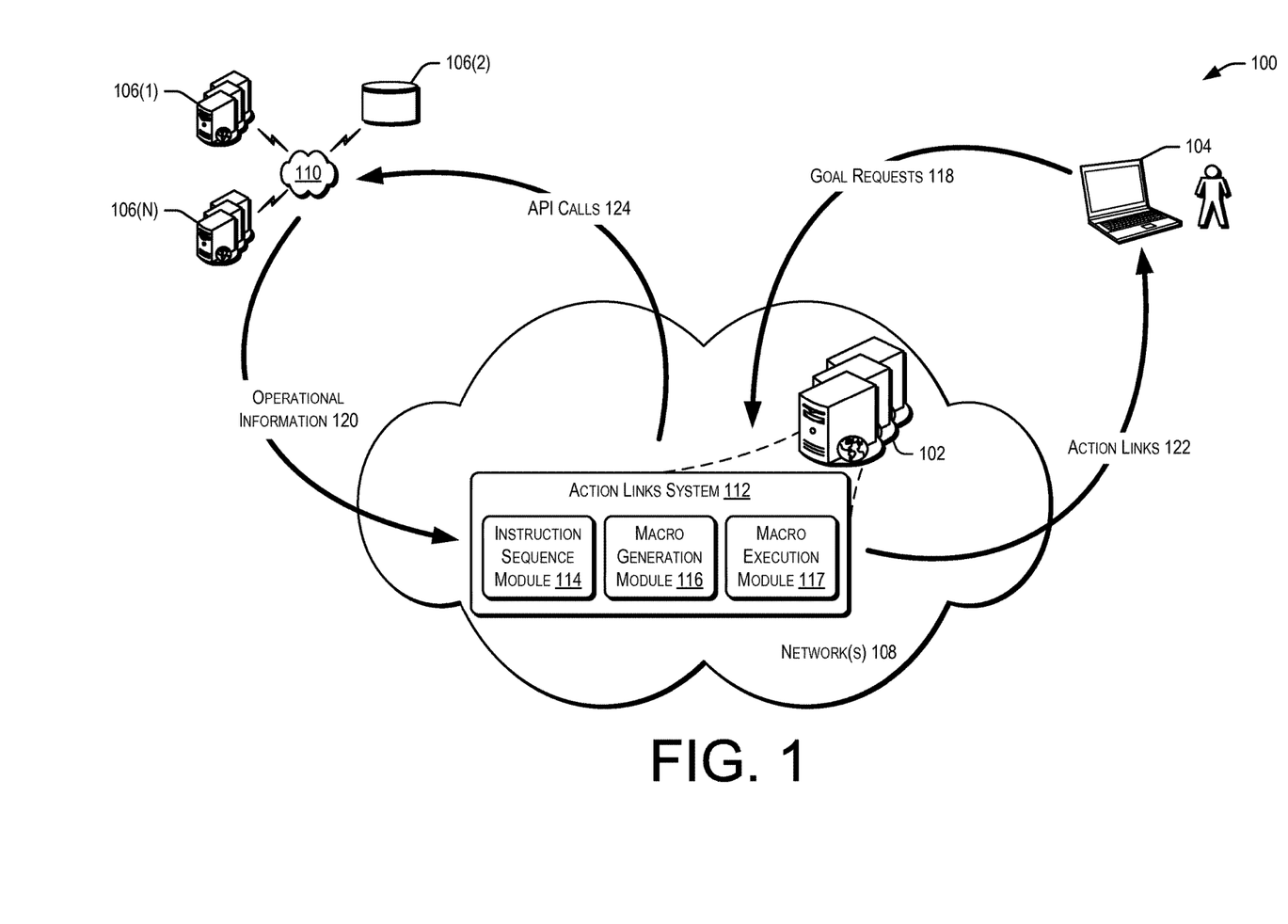
FIG. 1 illustrates an example architecture for implementing techniques for managing and/or providing the customized action links described herein, according to at least one example.

FIG. 1 depicts an illustrative architecture 100 in which techniques for providing customized action links as discussed herein may be implemented. These techniques are described in more detail below in connection with at least FIGS. 2-7. Returning to FIG. 1, the illustrative architecture 100 includes one or more service provider computers 102 accessible by one or more user devices 104 and/or one or more distributed computing resources 106(1)-(N) (collectively, "resources 106") over one or more networks 108. Additionally, the resources 106 may be accessible with one another over one or more networks 110 and may, in some examples, be managed by or otherwise implemented as part of the service provider computers 102. By way of example only, the service provider computers 102 may provide websites, web services, and/or distributed computing resources (e.g., the resources 106) that may include client instances (e.g., virtual computing devices), data centers, web servers, or the like. In some examples, a website of the service provider computers 102 may provide account and/or resource 106 management for customers of the service provider's computers 102.

In some examples, the networks 108 and/or 110 may include any one or a combination of many different types of networks, such as cable networks, the Internet, wireless networks, cellular networks, and other private and/or public networks. While the illustrated example represents the user devices 104 and/or the distributed resources 106 accessing the service provider computers 102 over the networks 108 and/or 110, the described techniques may equally apply in instances where the user devices 104 and/or the distributed resources 106 interact with the service provider computers 102 wirelessly, using fiber optics, or any other communication type, or in any other manner. It is also noted that the described techniques may apply in other client/server arrangements (e.g., set-top boxes, etc.), as well as in non-client/server arrangements (e.g., locally stored applications, etc.).

In some aspects, the service provider computers 102 may be any type of computing devices such as, but not limited to, mobile, desktop, thin-client, virtual, and/or cloud computing devices. In some examples, the service provider computers 102 may be in communication with the user devices 104 and/or the distributed resources 106 as noted above via the networks 108 and/or 110, or via other network connections. The service provider computers 102 may include one or more computing resources (e.g., the resources 106), perhaps arranged in a cluster, as a server farm, as individual servers not associated with one another, or not as servers at all (e.g., as virtual computing devices, datacenters, switches, or the like). These resources 106 may be configured to generate, manage, and/or provide customized action links as part of an integrated, distributed computing environment. Additionally, the service provider computers 102 may include (e.g., stored in memory and executable by one or more processors) action links system 112 that at least includes a network of computing resources that are collectively configured to generate, manage, and/or provide the customized action links described herein.

More specifically, in some examples, the action links system 112 may be supported by an instruction sequence module 114, a macro generation module 116, and/or a macro execution module 117. As used herein, modules may refer to programming modules executed by servers or clusters of servers that are part of a service (e.g., provided by the service provider computers 102). In this particular context, the modules may be executed by the servers or clusters of servers that are part of the action links system 112. The instruction sequence module 114 may be configured to determine or otherwise generate one or more instructions (e.g., in a set or based at least in part on a sequence) for implementing customer jobs (or actions). As noted above, a job may include a set of instructions that when executed may perform one or more distributed computing resource operations that together, complete an action or set of actions (e.g., backup data, move data, generate reports, process information, balance network loads, etc.). For example, the instruction sequence module 114 may determine a set of instructions (e.g., including API calls to web services or computing resources 106) for implementing a customer requested job and/or one or more best practice jobs. Additionally, in some examples, the instruction sequence module 114 may rely on human interaction for determining the appropriate sequence of instructions for generating macros.

In some examples, the macro generation module 116 may be configured to generate a macro, workflow, or other instruction implementation technique for performing a set of instructions. The macro generation module 116 may also be configured to generate the macros based at least in part on instructions determined by the instruction sequence module 114. For example, the instruction sequence module 114 may determine a set or sequence of instructions that would be appropriate for completing a job, and the macro generation module 116 may then generate a macro based at least in part on those instructions. The macro generation module 116 may also generate an action link based at least in part on a generated macro. Alternatively, or in addition, the macro may be represented by a link that, when selected by a user, causes implementation (i.e., replay) of the generated macro. Additionally, in some examples, the macro generation module 116 may also be configured to provide the action link (i.e., the macro or a link to cause implementation of the macro by the service provider computers 102) to customers. In some examples, macros or links may be configured to correspond or be tied to one or more specific distributed resources 106. For example, a macro may be configured to process a particular set of user data (e.g., stored in a particular datacenter or bucket) to generate a particular resource (e.g., a spreadsheet or the like) based on the set of user data.

Additionally, in some examples, the macro execution module 117 may be configured to execute set of instructions defined by the macro. For example, the macro execution module 117 may perform each or a subset of the sequence instructions generated by the macro generation module 116. In some aspects, the macro execution module 117 may execute the instructions based at least in part on a request from a user, based at least in part on information or observed operations of the distributed resources 106, and/or based at least in part on user configurations (e.g., a specific time interval or other setting for backing up data or performing other operations or jobs on behalf of the user).

In one non-limiting example, the service provider computers 102 may receive goal requests (or goal information not necessarily in a request) 118 from user computers 104. Alternatively, or in addition, the service provider computers 102 may receive operational information 120 from the one or more distributed resources 106. In some examples, the operational information 120 may include best practice information (e.g., configuration and/or setting information that be recommended to users), data indicative of operational conditions (e.g., network congestion, data storage capacity levels, etc.), data indicative of particular operations being performed or scheduled for the customers or other users, and/or user-specific information associated with the one or more distributed resources 106. In this way, the service provider computers 102 may be informed of both user goals 118 and operation information 120 may aid in informing and/or determining action links to be generated, managed, and/or provided by the action links system 112. Additionally, in some examples, based at least in part on the received information (goal requests 118 and/or operational information 120), one or more action links 122 may be provided by the action links system 112 to the user devices 104.

In some aspects, based at least in part on selection of one of the action links by a customer associated with the user devices 104, the service provider computers 102 may perform one or more API calls 124 to cause implementation of the job (i.e., implementation of each instruction of the set of instructions captured or otherwise performed by the macro and/or workflow). As such, selection of an action link 122 by a customer may cause performance of the instructions associated with the macro (e.g., the API calls 124) which may cause the resources 106 (e.g., web services) to perform appropriate resource operations. In some examples, the selection of the action link may be performed via a management console provided by the action links system 112 to the customer devices 104 (e.g., as part of a website or user interface), via a command line tool (e.g., a user of the customer device 104 may provide command line instructions for implementing the macro), and/or via performing one or more API calls 124 directly from the customer device 104. In one non-limiting example, the operational information 120 may include user-specific information (e.g., a number of instances being utilized, an amount of data processed by an instance, etc.) or information associated with operation of a user-specific resource. As such, in some cases, the goal request 118 may include a request to receive such operational information 120, and receipt of that operational information 120 may be requested from the resources 106 by selection of an action link and/or execution of a macro designed to provide that operational information 120. Additionally, when the operational information 120 includes user-specific information (e.g., identification of an instance being operated on behalf of the user), that user-specific information may be requested in order to enable collection of the appropriate operating information associated with that particular instance (e.g., based at least in part on instance identifier).

Figure 2:
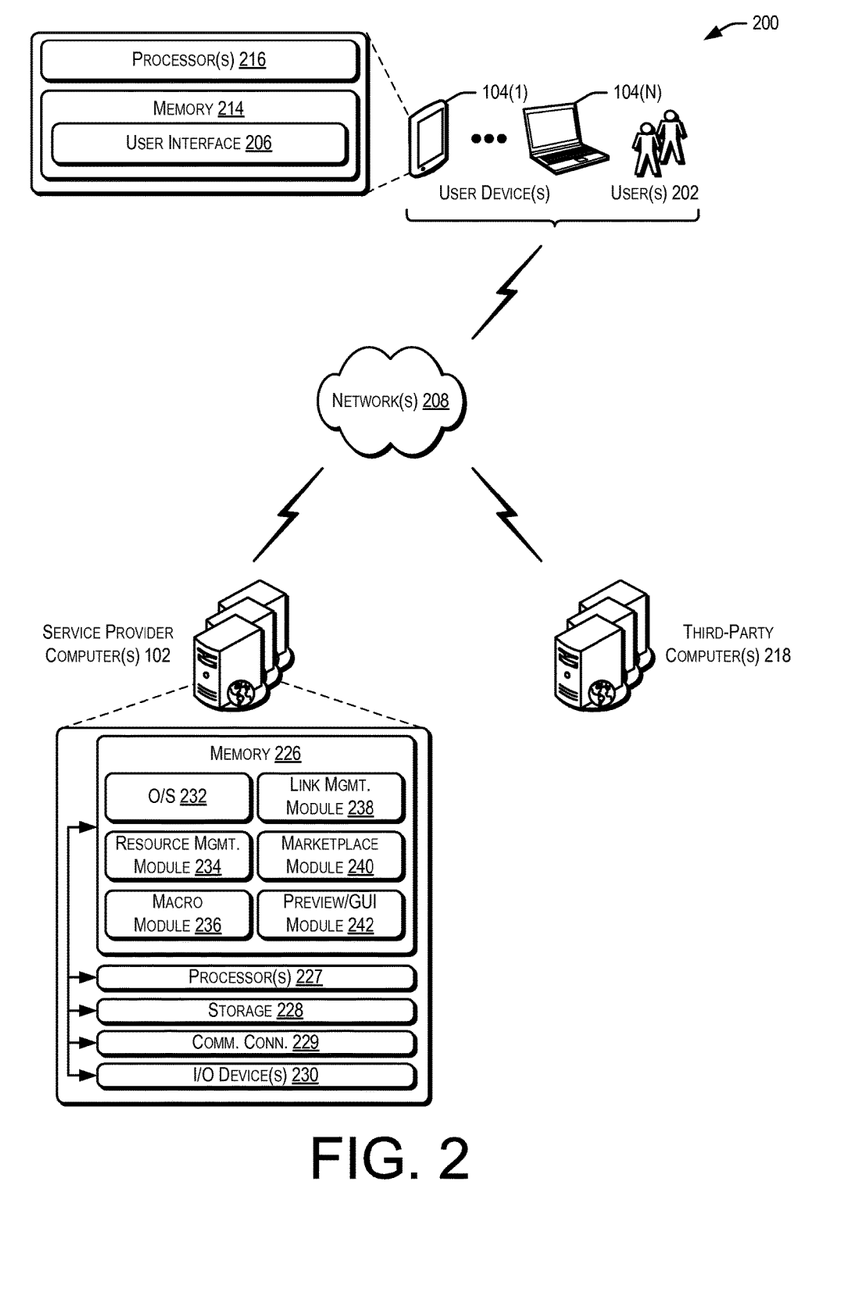
FIG. 2 illustrates another example architecture for implementing techniques for managing and/or providing the customized action links described herein, according to at least one example.

FIG. 2 depicts an illustrative system or architecture 200 in which techniques for managing and/or providing customized action links may be implemented. In architecture 200, one or more customers and/or users 202 (i.e., account holders) may utilize user computing devices 104 as described with reference to FIG. 1 to access a user interface 206, or a user account accessible through the user interface 206, via one or more networks 208. In some aspects, the user interface 206 and/or user account may be hosted, managed, and/or otherwise provided by a computing resources service or service provider, such as by utilizing one or more service provider computers 102 as described with reference to FIG. 1. In some examples, a customer may own, manage, operate, control, or otherwise be responsible (e.g., financially) for one or more accounts, groups of accounts, and/or sub-groups of accounts. The one or more service provider computers 102 may, in some examples, provide computing resources such as, but not limited, web hosting, client entities, data storage, data access, data management, virtualization, etc. In some aspects, a processing entity may be virtual and/or data volumes may be stored virtually within a distributed computing system operated by the one or more service provider computers 102. The one or more service provider computers 102 may also be operable to provide web hosting, email hosting, online catalogs, product reviews, combinations of the foregoing, or the like to the one or more users 202.

In some examples, the networks 208 may include any one or a combination of many different types of networks, such as cable networks, the Internet, wireless networks, cellular networks, and other private and/or public networks. While the illustrated example represents the users 202 accessing the web browser 206 over the networks 208, the described techniques may equally apply in instances where the users 202 interact with a service provider computer 102 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, mobile applications, etc.).

As described briefly above, the user interface 206 may allow the users 202 to interact with a service provider computer 102, such as to store, access, and/or manage data, develop and/or deploy computer applications, host web content, and/or provide items for consumption or sale. The one or more service provider computers 102, perhaps arranged in a cluster of servers or as a server farm, may host the user interface 206 (e.g., a GUI of a website via a web browser). Other server architectures may also be used to host the user interface 206. The user interface 206 may be capable of handling requests from many users 202 and serving, in response, various GUI elements that can be rendered at the user devices 104. The user interface 206 can access and/or render any type of website that supports user interaction, including social networking sites, online retailers, informational sites, blog sites, search engine sites, news and entertainment sites, and so forth. As discussed above, the described techniques can similarly be implemented outside of the user interface 206, such as with other applications (e.g., a web browser or the like) running on the user devices 104.

As noted above, the architecture 200 may include one or more user devices 104. The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 102 via the networks 208, or via other network connections.

In one illustrative configuration, the user devices 104 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described.

The memory 214 may store program instructions that are loadable and executable on the processor(s) 216, as well as data generated during the execution of these programs. Depending on the configuration and type of user device 104, the memory 214 may be volatile (such as random access memory (RAM)) and/or non-volatile (such as read-only memory (ROM), flash memory, etc.). The user device 104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein including at least the user interface 206. The user interface 206 (e.g., when implemented by a web browser) may be configured to receive, store, and/or display a website or other interface for interacting with the service provider computers 102. The user interface 206 may also be configured to provide one or more customized action links, macros, or the like. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user-provided response to a security question or a geographic location obtained by the user device 104.

In some examples, the service provider computers 102 may also be any type of computing devices such as, but not limited to, mobile, desktop, thin-client, and/or cloud computing devices, such as servers. In some examples, the service provider computers 102 may be in communication with the user devices 104 and/or one or more third-party service provider computers 218 via the networks 208, or via other network connections. The service provider computers 102 may include one or more servers, perhaps arranged in a cluster, as a server farm, or as individual servers not associated with one another. These servers may be configured to host a website (or combination of websites) viewable via the user devices 104 or a web browser or other interface (e.g., the user interface 206) accessible by a user 202. Additionally, in some aspects, the service provider computers 102 may be configured to determine, manage, and/or provide the customized action links described herein as part of an integrated, distributed computing environment.

In one illustrative configuration, the service provider computers 102 may include at least one memory 226 and one or more processing units (or processor(s)) 227. The processor(s) 227 may be implemented as appropriate in hardware, computer-executable instructions, firmware, or combinations thereof. Computer-executable instruction or firmware implementations of the processor(s) 227 may include computer-executable or machine-executable instructions written in any suitable programming language to perform the various functions described.

The memory 226 may store program instructions that are loadable and executable on the processor(s) 227, as well as data generated during the execution of these programs. Depending on the configuration and type of service provider computers 102, the memory 226 may be volatile (such as RAM) and/or non-volatile (such as ROM, flash memory, etc.). The service provider computers 102 or servers may also include additional storage 228, which may include removable storage and/or non-removable storage. The additional storage 228 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 226 may include multiple different types of memory, such as SRAM, DRAM, or ROM.

The memory 226, the additional storage 228, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 226 and the additional storage 228 are all examples of computer storage media. Additional types of computer storage media that may be present in the service provider computers 102 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 102. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 102 may also contain communications connection(s) 229 that allow the service provider computers 102 to communicate with a stored database, another computing device or server, user terminals and/or other devices on the networks 208. The service provider computers 102 may also include I/O device(s) 230, such as a keyboard, a mouse, a pen, a voice input device, a touch input device, a display, speakers, a printer, etc.

Turning to the contents of the memory 226 in more detail, the memory 226 may include an operating system 232 and/or one or more application programs or services for implementing the features disclosed herein including a resource management module 234, a macro module 236, a link management module 238, a marketplace module 240, and/or preview/GUI module 242. In some examples, the resource management module 234 may be configured to manage account resources (e.g., account information, configurations, implemented or purchased resources, etc.). That is, the resource management module 238 may manage or otherwise be responsible for managing account data as well as implementing instructions or performing API calls to cause implementation of instructions for operating the resources on behalf of the users 202. For example, if a user 202 purchases a new machine instance to operate a new website or the like, the resource management module 234 may be responsible for implementing or instantiating the new machine instance for the user 202.

In some aspects, the macro module 236 of FIG. 2 may be configured as the macro generation module 116 of FIG. 1. As such, the macro module 236 may be configured to generate or otherwise define the one or more macros or links that are to be provided to the users 202. In some examples, the macro module 236 may build a macro based at least in part on a set or sequence of instructions known to cause performance of one or more resource operations. Additionally, the macro module 236 may also be configured to utilize a workflow engine or the like for managing the set or sequence of instructions. In some aspects, the macro module 236 may also be configured to provide the macros and/or links to the users 202. However, in other examples, the links may be provided by the link management module 238. For example, in some aspects, the link management module 238 may be configured to receive pre-built macros and/or links from the macro module 236. The link management module 238 may provide the links the users 202. Additionally, the link management module 238 may also manage one or more different links (e.g., received from different sources, defined by the service provider computers, and requested directly from the users 202). Managing the links may, in some examples, also include providing lists of available links, filtering lists of available links, ranking and/or ordering the links based at least in part on user reviews, price, time to complete, expiration (e.g., some links may have an expiration period or data after which the link may no longer work), etc.

In some examples, the marketplace module 240 may work in conjunction with the link management module 238 to provide one or more available action links to users 202. Alternatively, the marketplace module 240 may receive links provided by the link management module 238 and provide those links to the users 202 directly. As desired, the marketplace module 240 may be configured to provide third-party-provided action links, service provider-provided action links, and/or user-provided links. In some aspects, different action links may be sold, leased, or rented to users 202 at different prices. As noted, some action links may have expiration dates that indicate how long the action link will work for. In some cases, action links with expiration dates may be cheaper than those without. Additionally, in some aspects, it may be less expensive to rent or lease an action link for a particular period of time, for a number of uses, and/or based at least in part on other information. In some examples, revenue may be shared with action link providers based at least in part on revenue generated form the direct sale or lease of the action links. However, revenue may also be shared with action link providers based at least in part on revenue generated from the sale or lease of distributed resources that maybe purchased or utilized as a result of implementing the action link. For example, if an action link is chosen by a user 202, and that action link includes utilizing a datacenter that the user 202 was not previously utilizing, the user 202 may be charged for selecting or otherwise utilizing the action link, and also for the use of the datacenter.

Further, in some examples, the preview/GUI module 242 may be configured to provide an action link GUI (e.g., the user interface 206) for rendering visual representations of the action links. For example, a user 202 may receive one or more action links at the user devices 104 and may be able to view the action links via the preview/GUI module 242. Additionally, in some examples, the preview/GUI module 242 may be configured to generate and/or render a preview of the distributed resource operations that may be caused to be performed by the instructions (or sequence of instructions) contained within the macros and/or action links. For example, a macro may include instructions for performing one or more API calls. Each of these API calls may cause a web service or other distributed resource to perform an operation associate with data of the user 202. As such, the preview/GUI module 242 may be configured to render (e.g., via the user interface 206) one or more icons, images, videos, or other visual representation of the operations that may be performed by the web services or other distributed resources. In this way, the users 202 may visual the operations that are to be performed by selecting or activating the actions links.

A few additional examples of the operations of the service provider computers 102 are also described in greater detail below with reference to FIGS. 3-7.

Figure 3:
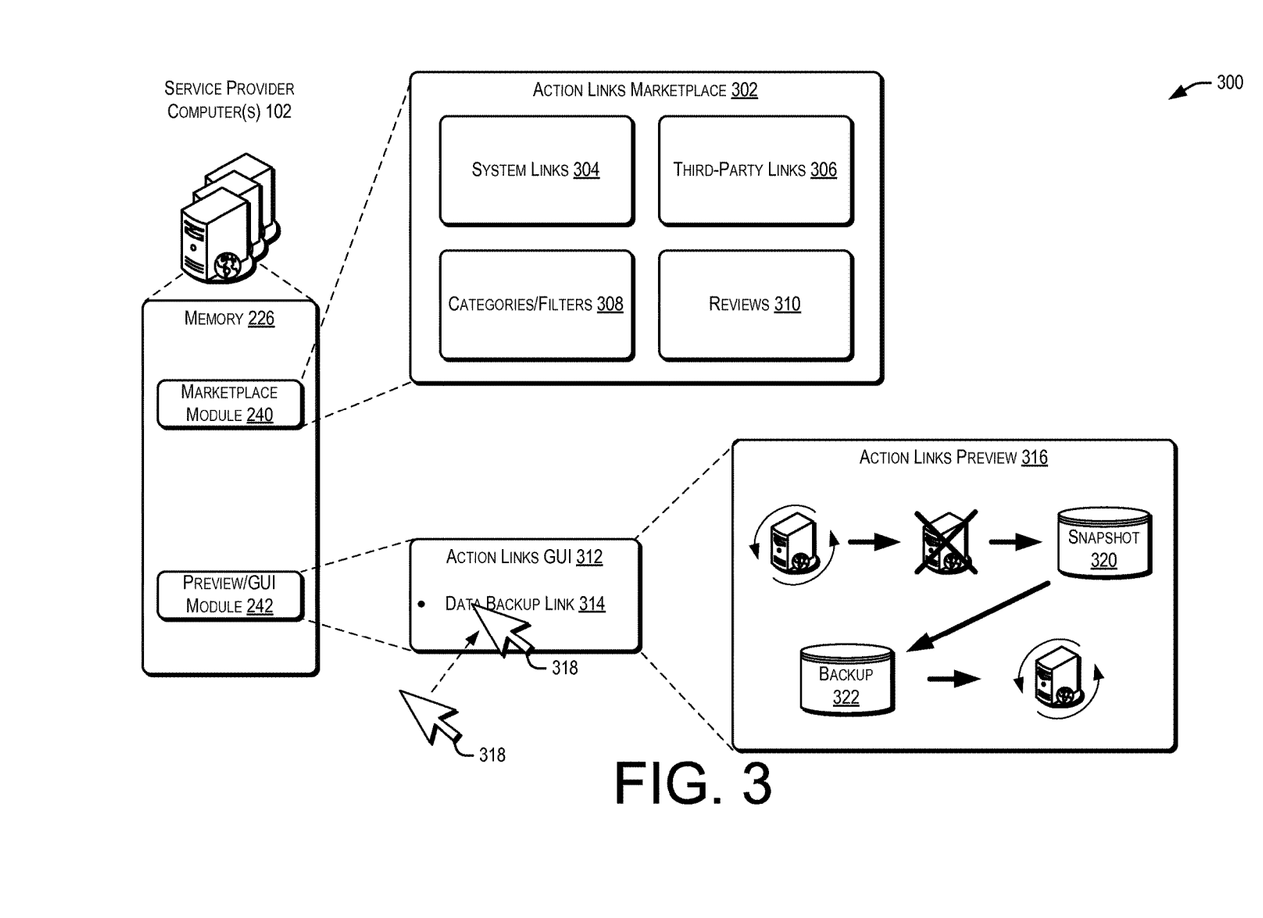
FIG. 3 illustrates yet another example architecture for implementing techniques for managing and/or providing the customized action links described herein, according to at least one example.

FIG. 3 illustrates another example architecture 300 for implementing at least a few additional features of the customized action link techniques described herein. For example, the marketplace module 240 of the service provider computers 102 (e.g., stored in memory 226) may be further configured to provide an action links marketplace 302 that may, in some examples, be rendered to a user 202 via the user interface 206 of FIG. 2. Additionally, in some examples, the action links marketplace 302 may include multiple different features and/or types of actions links that may be viewed, browsed, and/or purchased (e.g., for sale or rent). In one non-limiting example, the action links marketplace 302 may include system links 304, third-party links 306, categories/filters 308, and/or reviews 310. More specifically, and without limitation, system links 304 may include links that were either generated or otherwise provided by the service provider computers. In some examples, these system links 304 may be based at least in part on resource operational information, best practice information, and/or detected anomalies within the distributed system. Additionally, in other non-limiting examples, third-party links 306 may include action links provided by third-parties. Further, the action links marketplace 302 may also be configured track modification made to either system links 304 and/or third-party links 306 made by users 202 (or other entities). In this way, reviews may be placed appropriately and/or revenue may be shared with the appropriate parties.

In some examples, the action links marketplace 302 may also be configured to categorize and/or filter 308 the action links that are provided. For example, categories may include, but are not limited to, system links 304, third-party links 306, data storage links, data computation links, network traffic links, etc. Additionally, filters may be employed that allow users 202 to view less than all the action links provided by the marketplace. Further, in some examples, the action links marketplace 302 may be configured to receive and/or manage reviews 310 of the action links provided. For example, users 202 (or other entities, e.g., third-parties) may provide reviews of the different action links that are offered by the actin links marketplace 302. Reviews 310 may be used for filtering and/or as categories. Reviews may also be utilized to determine appropriate portions of revenue sharing or the like.

Additionally, in some examples, the preview/GUI module 242 may be configured to provide an action links GUI 312 (that may be the same as or may supplement the user interface 206 of FIG. 2). In some aspects, the action links GUI 312 may be configured to provide one or more action links in textual form, as a hyperlink, as an icon, as an image, or the like. For example, the action links GUI 312 may render a data backup link 314. As shown in FIG. 3, the data backup link 314 may look like a hyperlink; however, it may include additional information and/or metadata that a hyperlink may not be capable of including. For example, the data backup link 314 may include information that may be utilized by the action links GUI 312 to display an action links preview 316. As such, when a cursor 318 is moved to hover over the data backup action link 314, the action links preview 316 may be instructed to render the visual representation of resource operations that will be performed if the data backup link 314 is selected. For example, and without limitation, a server may be running, then it may be stopped, a snapshot may then be taken of the data to be backed up (e.g., at 320), the snapshot may be stored in a backup location (e.g., at 322), and then the server may be restarted. As discussed above, this sequence of operations may not be known to a user 202; however, may be provided as a visual representation of the operations that will be performed to complete the requested or selected job.

In some aspects, the user may request that an action link be generated for them or may select from a set of pre-generated action links to perform a data backup, without knowledge of any particular sequence of operations. The action link, when selected, may then implement the workflow engine or the macro to replay the sequence of instructions that would make the appropriate API calls to cause the operations (e.g., as shown in the action links preview 316) to be performed. Further, in some examples, step number, operation information, and/or state may be provided within the action links preview 316 (e.g., when the cursor 318 is placed over a particular operation image). Other examples of information provided in the action links preview 316 may also include, but are not limited to, user specific data, data location identifiers, resource identifiers, and/or estimations of how long each operation may take to be performed. In some cases, however, any private/sensitive user information may only be provided in the action links preview 316 if the user is logged-in or otherwise authenticated. Additionally, the data backup link 314 may also include the information and/or metadata appropriate to implement the macro or workflow at the service provider computers 102 based at least in part on selection of the data backup link 314 at the user device 104.

Figure 4:
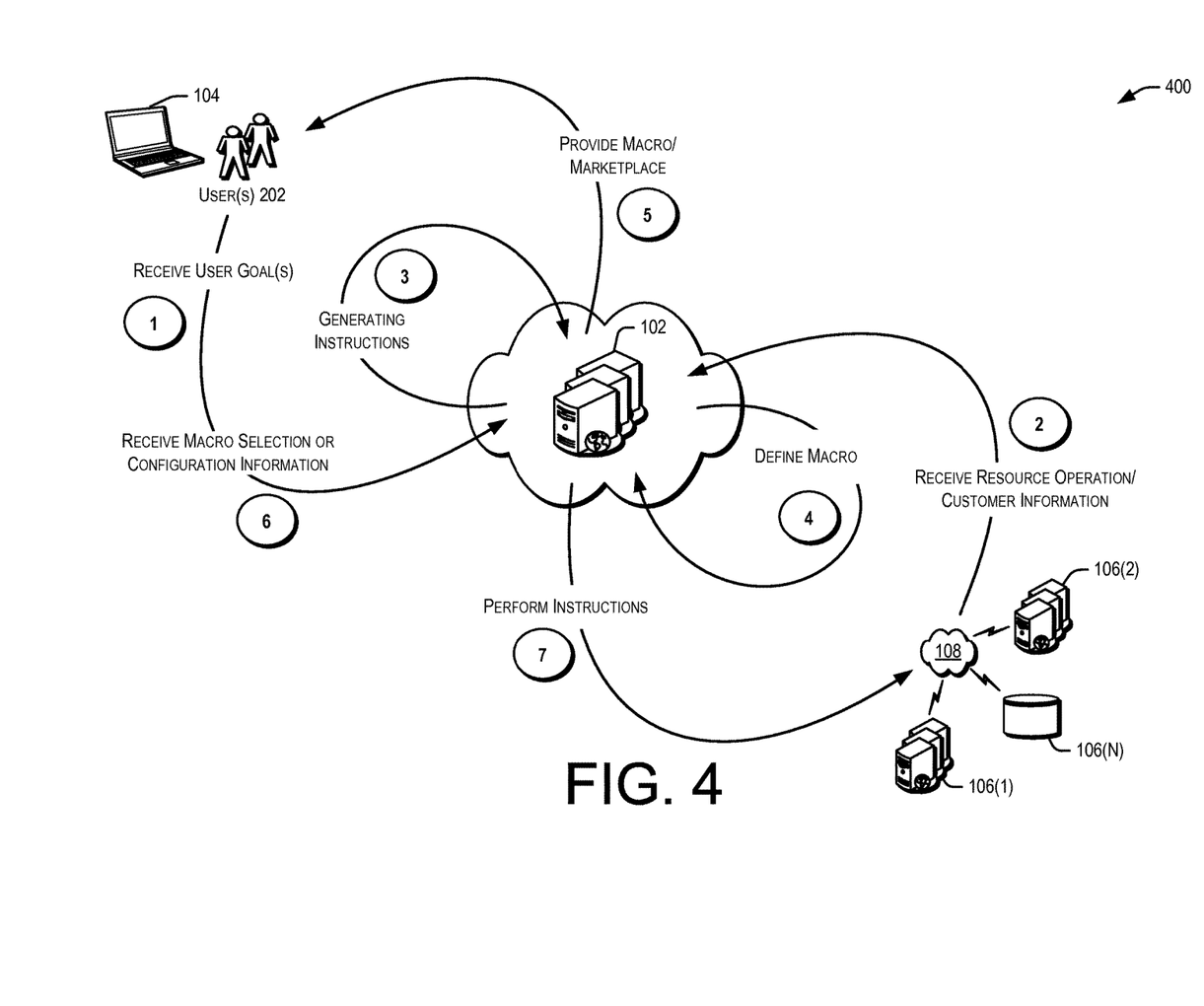
FIG. 4 illustrates an example flow diagram of a process for implementing techniques for managing and/or providing the customized action links described herein, according to at least one example.

FIG. 4 illustrates another example flow diagram showing one or more techniques 400 for providing and/or managing customized action links, as described herein. While techniques 400 are shown in FIG. 4 in a particular order (including arbitrary sequence numbers), it should be understood that no particular order is necessary and that one or more steps or parts of the techniques 400 may be omitted, skipped, and/or reordered. In at least one non-limiting example, the one or more service provider computers 102 described above with reference to FIGS. 1-3 may receive user goals from a user 202 utilizing a user device 104 (e.g., a user goal may be to back-up data to a different location or to balance loads at a particular virtual machine). Additionally, in some examples, the service provider computers may also receive resource operation information from one or more resource devices 106 described above with reference to at least FIG. 1.

In some examples, based at least in part on the received user goals and/or the received resource operation information, the service provider computers 102 may generate one or more instructions. For example, these instructions may include a sequence of instructions for performing API calls in a particular order for implementing a particular distributed resource job or set of actions. Additionally, based at least in part on the generated instructions, the service provider computers 102 may also define a macro or otherwise generate an action link. For example, the defined macro or action link may be based at least in part on generated instructions and/or configured to perform the generated instructions in the appropriate sequence. As noted, in some examples, the instructions may be generated based at least in part on receipt of the user goals (e.g., the instructions may be generated in such a way that they achieve the goal when executed). However, in other examples, the instructions may be generated based at least in part on the received resource operation information. For example, operational information may indicate one or more goals or jobs that should be requested by users and/or that the service provider computers 102 would like to provide to users (e.g., as an optional and/or recommended goal or job). As such, the instructions may be generated to perform one or more of these (preemptive) goals or jobs and may be provided to the users substantially immediately (e.g., shortly after identification of an operational issue) and/or may be included in a marketplace, gallery, or other interface for providing potential goals and/or jobs. As such, in one non-limiting example, the service provider computers 102 may identify (e.g., based at least in part on received operational information) that a user's 202 data has not backed up in a long time or that a customer's 202 log files are getting full. In this example, the instructions may be generated (and a macro defined) to alleviate the identified issue (e.g., a macro to back up the data and/or to clean up the log files for the user 202).

In some examples, the macro or action link may then be provided to the users 202 by the service provider computers 102. In this way, the users 202 may preview the operations to be performed by the macro (e.g., in a visual representation via a GUI or other interface). Additionally, the users 202 may choose to purchase and/or lease the action link. As such, the service provider computers 102 may receive an indication of selection of the action link and/or configuration information corresponding to the users 202. Further, in some examples, the service provider computers 102 may perform the instructions at least in response to a selection and/or purchase of the action links by the user 202. Alternatively, or in addition, performance of the instructions may be based at least in part on the user 202 configuration settings as opposed to in response to selection of a link (e.g., a user 202 may configure their account to utilize a link at specified time intervals). As noted above, performance of the instructions may include activating the workflow engine configured with the set of instructions. Performance may also include performing one or more API calls (e.g., generated and/or provided by the distributed resources 106) for causing resource operations to be performed by the resources 106.

Figure 5:
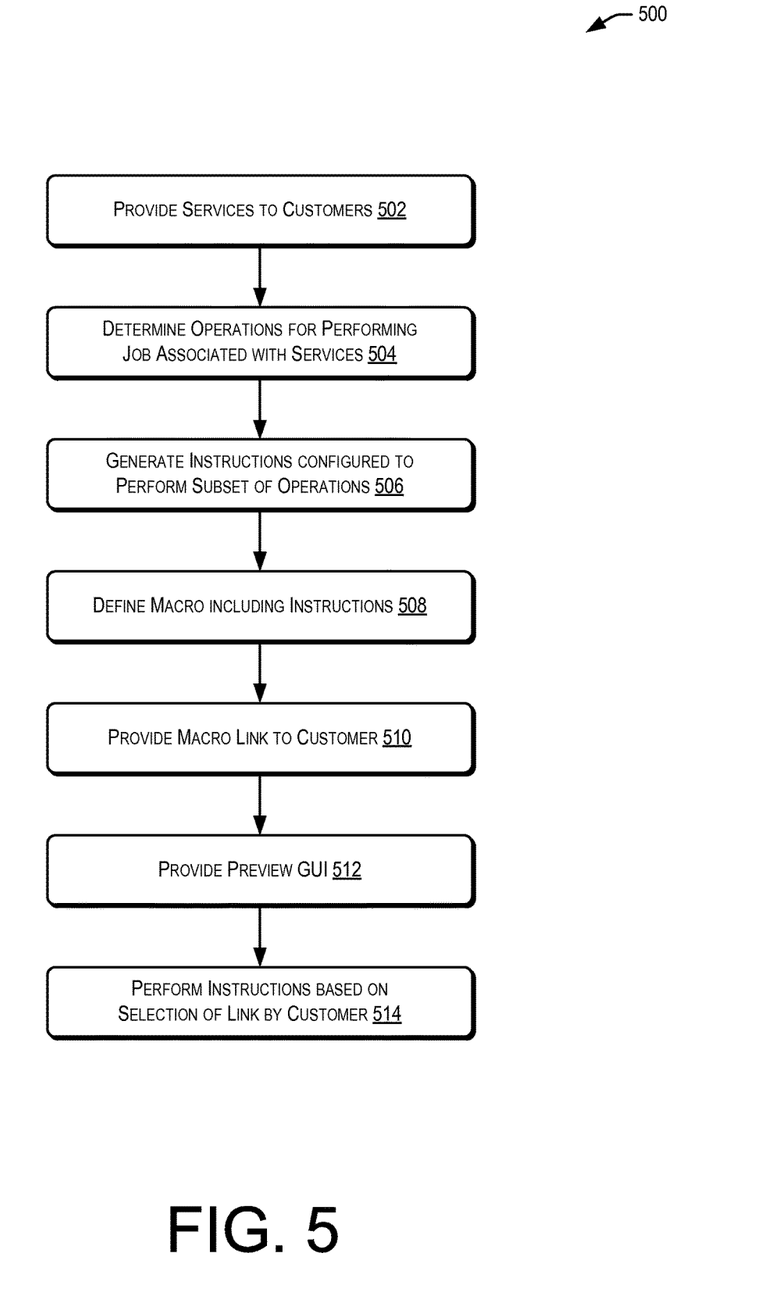
FIG. 5 illustrates another example flow diagram of a process for implementing techniques for managing and/or providing the customized action links described herein, according to at least one example.
Figure 6:
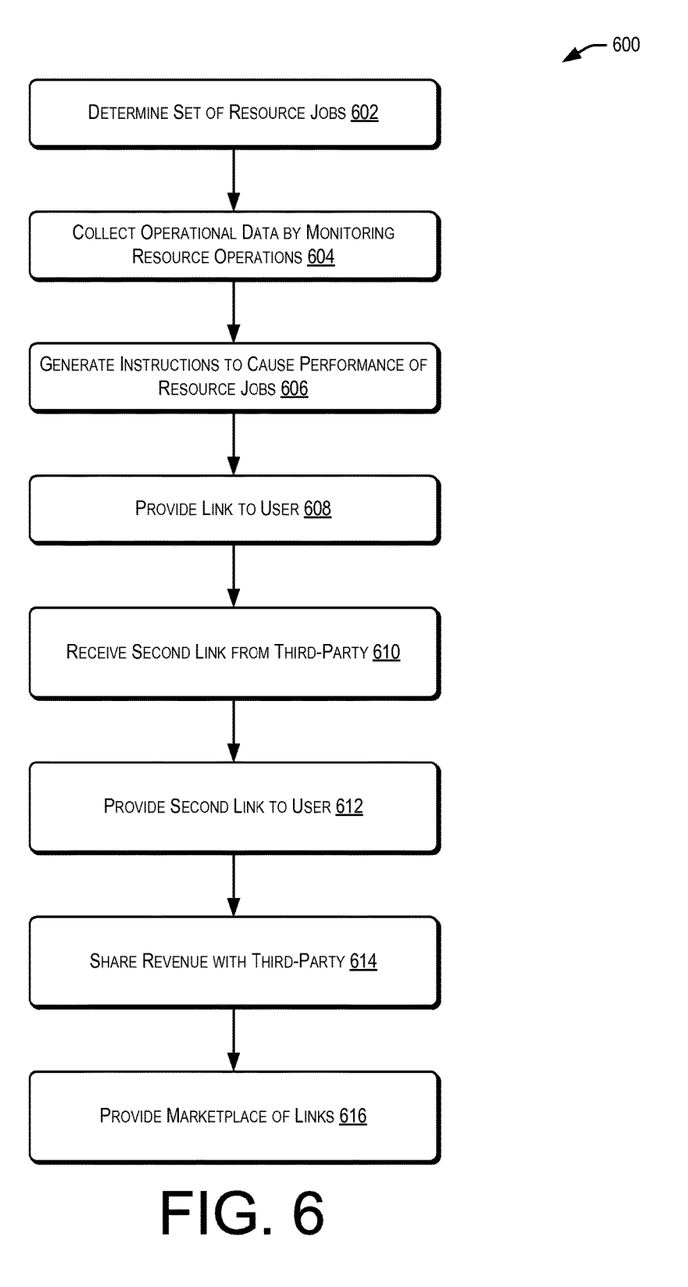
FIG. 6 illustrates another example flow diagram of a process for implementing techniques for managing and/or providing the customized action links described herein, according to at least one example.

FIGS. 5 and 6 illustrate example flow diagrams showing respective processes 500 and 600 for implementing the management and/or provisioning of customized action links. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 102 (e.g., utilizing at least one of the instruction sequence module 114, the macro generation module 116, and/or the link management module 238) shown in FIGS. 1-4 may perform the process 500 of FIG. 5. The process 500 may begin by including providing distributed services to customers of a distributed system at 502. At 504, the process 500 may include determining operations for performing one or more jobs (or sets of actions) associated with the services. For example, as described in FIG. 3 with reference to the action links preview 316, each of the images may represent a separate operation to be performed to fulfill a single job. At 506, the process 500 may include generating instructions configured to perform at least a subset of the determined operations. For example, the instructions may include a list of API method calls to be made (and, in some examples, in a particular order) by the service provider computers 102 of FIGS. 1-4. Additionally, the process 500 may also include defining a macro or action link that includes the generated instructions at 508. The macro or action link may be implemented by workflow engine or other method for performing the instructions in the appropriate sequence and/or utilizing the appropriate attributes and/or data. At 510, the process 500 may include providing the macro and/or action link to a customer or other user of the system. Additionally, the process 500 may include providing a preview and/or GUI for viewing the preview of the operations to be performed at 512. Further, the process 500 may terminate at 514, where the process 500 may include preforming instructions for implementing the macro based at least in part on selection of the macro or action link by the customer.

FIG. 6 illustrates an example flow diagram showing process 600 for implementing the management and/or provisioning of customized action links. The one or more service provider computers 102 (e.g., utilizing at least one of the instruction sequence module 114, the macro generation module 116, and/or the link management module 238) shown in FIGS. 1-4 may perform the process 600 of FIG. 6. The process 600 may begin by including determining a set of resource actions at 602. For example, the process 600 may determine a resource job (e.g., a set of operations that may accomplish a set of actions for a user) based at least in part on a user goal and/or best practice information of the system. At 604, the process 600 may include collecting operational data by monitoring the resource operations of the distributed system. Additionally, in some examples, the process 600 may include generating instructions to cause performance of the determined resource actions at 606. At 608, the process 600 may include providing an action link to a user. The action link may be a macro or link configured to enable implementation of a workflow (e.g., to replay the instructions that make up the macro or link). At 610, the process 600 may include receiving a second link from a third-party. For example, third-party link providers may generate action links configured to enable particular jobs to be performed for the users. At 612, the process 600 may include providing these second links to the users. At 614, the process 600 may also include sharing revenue with the third-parties based at least in part on a purchase of the second links and/or purchase of one or more resources of the disturbed system. Further, the process 600 may terminate at 616, where the process 600 may include providing a marketplace of action links to the user. The marketplace may include the links generated based at least in part on user requests or goals, the links generated by third-parties, and/or other links from other sources.

Illustrative methods and systems for implementing the management and/or provisioning of customized action links are described above. Some or all of these systems and methods may, but need not, be implemented at least partially by architectures and processes such as those shown at least in FIGS. 1-6 above.

Figure 7:
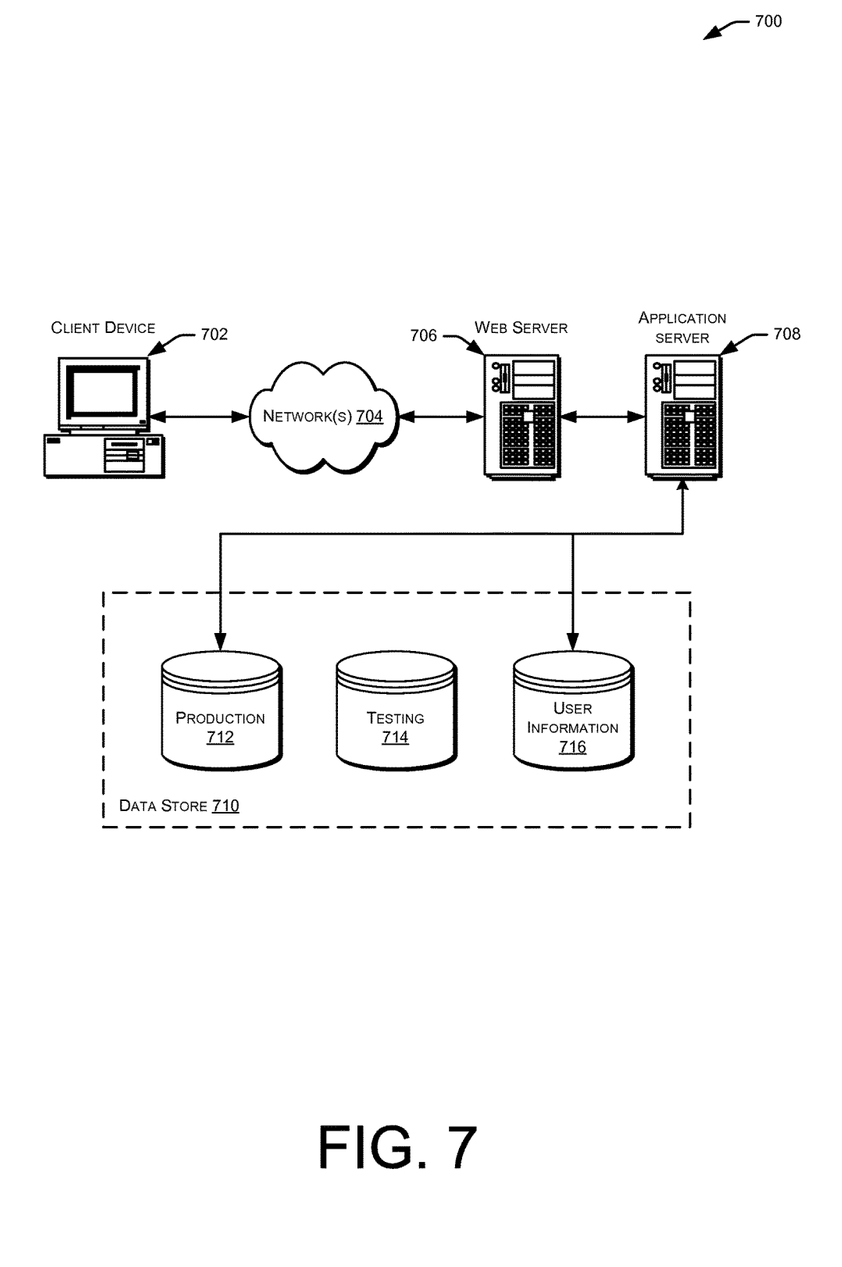
FIG. 7 illustrates an environment in which various embodiments of the techniques for managing and/or providing the customized action links described herein can be implemented, according to at least one example.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for managing resource operation instructions of a distributed computing system, comprising:
under control of one or more computer systems configured with executable instructions,
providing one or more computing services of the distributed computing system to a user of the distributed computing system;
determining a job to perform with respect to data stored by the distributed computing system;
determining a plurality of computing resource operations to be executed by the distributed computing system to perform the job;
generating a set of instructions configured to perform the plurality of computing resource operations;
generating a macro based at least in part on the set of instructions;
generating a link to the macro;
providing, to a device of the user of the distributed computing system, the link to the macro;
receiving, from the device, an indication of a selection of the link;
identifying, based at least partly on the selection of the link, an instance of the distributed computing system being operated to provide one of the one more computing services on behalf of the user;
causing performance, at least partly by the instance of the distributed computing system, of the plurality of computing resource operations of the job with respect to a portion of the data stored on the distributed computing system that is associated with the user;
providing, to an additional device of an additional user of the distributed computing system, an additional link to the macro;
receiving, from the additional device, an indication of a selection of the additional link; and
replaying, based at least partly on the selection of the additional ink, the macro to cause performance of the plurality of computing resource operations of the job with respect to an additional portion of data stored on the distributed computing system that is associated with the additional user.

2. The computer-implemented method of claim 1, further comprising performing the macro by a workflow engine, wherein the workflow engine fetches data at a configurable time interval.

3. The computer-implemented method of claim 1, further comprising providing a user interface configured to provide a graphical preview of the set of instructions to the of the user, wherein the graphical preview includes visual representations of the plurality of computing resource operations.

4. The computer-implemented method of claim 1, further comprising deleting the link after a period of time.

5. A computer-implemented method for managing resource operation instructions of a distributed computing system, comprising:
under control of one or more computer systems configured with executable instructions,
determining a plurality of computing resource operations for performing a computing resource job to accomplish a first goal of a user of the distributed computing system;
generating a set of instructions configured to cause performance of the plurality of computing resource operations;
generating a macro based at least in part on the set of instructions;
providing, to a computing device of the user, a link, wherein the link is configured to cause performance of the plurality of computing resource operations for performing the computing resource job based at least in part on the set of instructions;
monitoring the distributed computing system to collect operational information associated with an instance of the distributed computing system operating on behalf of the user;
determining, based at least partly on the operational information, that a condition occurred with respect to data of the user stored on the distributed computing system;
accessing, based at least partly on the condition occurring, an account of the user to identify the goal, wherein the condition corresponds to the first goal;
causing performance, at least partly by the instance of the distributed computing system and based at least partly on identifying the first goal, of the plurality of computing resource operations to perform the computing resource job with respect to the data of the user stored on the distributed computing system; and
replaying the macro, based at least partly on identifying a second goal in an additional account of an additional user of the distributed computing system, to cause performance of the plurality of computing resource operations to perform the computing resource job with respect to additional data of the additional user stored on the distributed computing system, the second goal being a same goal as the first goal.

6. The computer-implemented method of claim 5, wherein monitoring the distributed computing system and causing the performance of the plurality of computing resource operations are performed based at least partly on identifying selection of the link by the user.

7. The computer-implemented method of claim 5, wherein monitoring the distributed computing system and causing the performance of the plurality of computing resource operations are performed based at least partly on a configuration setting in the account of the user indicating utilization of the link at specified time intervals.

8. The computer-implemented method of claim 5, further comprising receiving, from a third-party computing system, at least a second link for performing a second computing resource job, the second link configured to cause performance of the second computing resource job based at least in part on a second set of instructions.

9. The computer-implemented method of claim 8, further comprising:
receiving, from the computing device, a request to perform the second computing resource job; and
providing the second link to the computing device.

10. The computer-implemented method of claim 9, further comprising providing, to the third-party computing system, a portion of revenue received from utilization of the distributed computing system based at least in part on the computing device utilizing the second link to perform the second computing resource job.

11. The computer-implemented method of claim 9, further comprising providing a marketplace of links including at least one of the link for performing the computing resource job, the second link for performing the second computing resource job, or one or more additional links for performing one or more respective additional computing resource jobs of the distributed computing system.

12. A system for managing resource operation instructions of a distributed computing system, comprising:
at least one memory that stores computer-executable instructions; and
at least one processor configured to access the at least one memory, wherein the at least one processor is configured to execute the computer-executable instructions to collectively at least:
determine a computing resource job to perform with respect to data stored by the distributed computing system;
determine a plurality of computing resource operations for performing the computing resource job;
generate a set of instructions configured to cause performance of the computing resource operations;
generate a macro based at least in part on the set of instructions;
provide, to a computing device of a user of the distributed computing system, a link to the macro;
receive, from the computing device, an indication of selection of the link;
identify, based at least partly on the selection of the link, an instance of the distributed computing system being operated to provide a service of the distributed computing system on behalf of the user;
cause performance, at least partly by the instance of the distributed computing system, of the computing resource operations with respect to a portion of the data stored by the distributed computing system that is associated with the user;
providing, to an additional device of an additional user of the distributed computing system, an additional link to the macro;
receiving, from the additional device, an indication of a selection of the additional link; and
replaying, based at least partly on the selection of the additional ink, the macro to cause performance of the plurality of computing resource operations of the job with respect to an additional portion of data stored on the distributed computing system that is associated with the additional user.

13. The system of claim 12, wherein a computing resource associated with the computing resource job is managed on behalf of an account of the user, and the computing resource job comprises at least changing a configuration corresponding to the account.

14. The system of claim 12, wherein the at least one processor is configured to execute the computer-executable instructions to further provide a gallery, wherein the gallery includes at least the computing resource job or one or more additional computing resource jobs identified by a third-party.

15. The system of claim 12, wherein the at least one processor is configured to execute the computer-executable instructions to further provide a graphical representation of the computing resource job, the graphical representation including visual representations of the computing resource operations.

16. One or more non-transitory computer-readable media storing computer-executable instructions for managing resource operation instructions of a distributed computing system that, when executed by one or more computer systems, configure the one or more computer systems to perform operations comprising:
   determining resource operations associated with performing a job to accomplish a first resource operation goal of a user of the distributed computing system;
   generating instructions configured to cause performance of the resource operations;
   generating a macro based at least in part on the set of instructions;
   generating a link that, when selected, causes performance of the resource operations associated with performing the job based at least in part on the instructions;
   providing, to a computing device of the user, the link;
   monitoring the distributed computing system to collect operational information associated with an instance of the distributed computing system operating on behalf of the user;
   determining, based at least partly on the operational information, that a condition occurred with respect to data of the user stored on the distributed computing system;
   accessing, based at least partly on the condition occurring, an account of the user to identify the first resource operation goal, wherein the condition corresponds to the first resource operation goal;
   causing performance, at least partly by the instance of the distributed computing system operating on behalf of the user and based at least partly on identifying the first resource operation goal, of the resource operations to perform the job with respect to the data of the user stored on the distributed computing system; and
   replaying the macro, based at least partly on identifying a second resource operation goal in an additional account of an additional user of the distributed computing system, to cause performance of the resource operations to perform the computing resource job with respect to additional data of the additional user stored on the distributed computing system, the second resource operation goal being a same resource operation goal as the first resource operation goal.

17. The one or more non-transitory computer-readable media of claim 16, wherein the link includes metadata associated with displaying a sequence of visual images that correspond to at least a portion of the resource operations.

18. The one or more non-transitory computer-readable media of claim 16, wherein the operations further comprise determining the first resource operation goal based at least partly on receiving, from the computing device, the first resource operation goal.

19. The one or more non-transitory computer-readable media of claim 16, wherein the operations further comprise determining the first resource operation goal based at least in part on operating procedures of the distributed computing system associated with a resource that is controllable by the resource operations.

20. The one or more non-transitory computer-readable media of claim 16, wherein the instructions configured to cause performance of the resource operations include at least an instruction to perform a remotely generated application programming interface method call.

21. The one or more non-transitory computer-readable media of claim 20, wherein the instructions are performed using a workflow configured to perform the remotely generated application programming interface method call.

22. The computer-implemented method of claim 5, wherein:
   the computing resource job is associated with a computing resource provided to the computing device; and
   causing performance of the plurality of computing resource operations for performing the computing resource job includes at least changing a configuration corresponding to the computing resource.

23. The computer-implemented method of claim 1, wherein the link includes metadata that includes information to display visual images of at least a portion of the computing resource operations performed to complete the job.

24. The computer-implemented method of claim 23, wherein:
   the plurality of computing resource operations are performed in a sequence to complete the job; and
   the metadata includes first information related to a first visual image of a first computing resource operation of the sequence and second information related to a second visual image of a second computing resource operation of the sequence.

* * * * *